United States Patent
Hsyu et al.

(10) Patent No.: US 7,970,575 B2
(45) Date of Patent: Jun. 28, 2011

(54) METHOD AND APPARATUS FOR DETERMINING ACCURACY OF THE ESTIMATED LOCATION FOR A TARGET IN A WIRELESS SYSTEM

(75) Inventors: Ming-Chun Hsyu, Taichung (TW); Wen Tsuei, Hsinchu (TW); Chao-Nan Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 368 days.

(21) Appl. No.: 12/346,878

(22) Filed: Dec. 31, 2008

(65) Prior Publication Data
US 2009/0112517 A1  Apr. 30, 2009

Related U.S. Application Data

(63) Continuation-in-part of application No. 11/737,756, filed on Apr. 20, 2007, now abandoned.

(51) Int. Cl.
*G01C 21/00* (2006.01)
*G06F 17/00* (2006.01)
(52) U.S. Cl. ........... 702/150; 702/181; 701/207
(58) Field of Classification Search ........... 702/150, 702/181, 189
See application file for complete search history.

(56) References Cited

U.S. PATENT DOCUMENTS

| | | | |
|---|---|---|---|
| 6,249,252 B1 * | 6/2001 | Dupray | 342/450 |
| 2004/0067759 A1 * | 4/2004 | Spirito et al. | 455/456.1 |
| 2005/0131635 A1 * | 6/2005 | Myllymaki et al. | 701/205 |
| 2005/0243936 A1 | 11/2005 | Agrawala et al. | |
| 2006/0276201 A1 * | 12/2006 | Dupray | 455/456.1 |

FOREIGN PATENT DOCUMENTS
WO  2005/062606 A1  7/2005
* cited by examiner

*Primary Examiner* — Hal D Wachsman (57) ABSTRACT

A method for determining the accuracy of the estimated position for a target device in a wireless system includes the computation of a confidence index. In the online location determining phase, after knowing the observations of the radio signal for a target device, the target device's probability distribution of location and its motion model are combined to calculate the position uncertainty, thereby giving the confidence index of this location estimate. The invention determines the location probability distribution, and calculates the uncertainty of the location probability distribution and the possible maximum uncertainty under the current situation. Based on these uncertainties, this invention determines the confidence index of the radio signal. The confidence may be regarded as a quantity that the location uncertainty can be excluded in the location prediction.

20 Claims, 14 Drawing Sheets

| $O_t$ \ $Q_t$ | SP1 | SP2 | SP3 | SP4 |
|---|---|---|---|---|
| 1 | $p(o_1=1\mid q_1 \text{SP1})=0.7$ | $p(o_1=1\mid q_1 \text{SP2})=0.05$ | 0.05 | 0.1 |
| 2 | $p(o_1=2\mid q_1 \text{SP1})=0.2$ | 0.6 | 0.4 | 0.03 |
| 3 | 0.05 | 0.3 | 0.5 | 0.07 |
| 4 | 0.05 | 0.05 | 0.05 | 0.8 |

FIG. 6a

| $Q_2$ \ $Q_1$ | SP1 | SP2 | SP3 | SP4 |
|---|---|---|---|---|
| SP1 | 0.2 | 0.3 | 0.2 | 0.3 |
| SP2 | 0.3 | 0.2 | 0.3 | 0.2 |
| SP3 | 0.2 | 0.3 | 0.2 | 0.2 |
| SP4 | 0.3 | 0.2 | 0.3 | 0.3 |

FIG. 6b

| Location probability density function | $p(q_1=SP1\|o_1=1)$ | $p(q_1=SP2\|o_1=1)$ | $p(q_1=SP3\|o_1=1)$ | $p(q_1=SP4\|o_1=1)$ |
|---|---|---|---|---|
| | 0.7179 | 0.0769 | 0.0514 | 0.1538 |

FIG. 6c

| $Q_2$ \ $o_2,o_1$ | 1,1 | 2,1 | 3,1 | 4,1 |
|---|---|---|---|---|
| SP1 | 0.7477 | 0.1447 | 0.0495 | 0.0433 |
| SP2 | 0.0663 | 0.5389 | 0.3690 | 0.0537 |
| SP3 | 0.0534 | 0.2894 | 0.4954 | 0.0433 |
| SP4 | 0.1326 | 0.0270 | 0.0861 | 0.8597 |

FIG. 6d

| CONFIDENCE INDEX | $R(o_2=1, o_1=1)$ | $R(o_2=2, o_1=1)$ | $R(o_2=3, o_1=1)$ | $R(o_2=4, o_1=1)$ |
|---|---|---|---|---|
| | 63.81% | 47.83% | 47.31% | 77.23% |

FIG. 6e

| TRANSISTION PROBABILITY | $p(SP1\vert SP1)$ | $p(SP2\vert SP1)$ | $p(SP3\vert SP1)$ | $p(SP4\vert SP1)$ |
|---|---|---|---|---|
| | 0.2 | 0.2 | 0.1 | 0.5 |

FIG. 6f

| $Q_2 \diagdown o_2, o_1$ | 1,1 | 2,1 | 3,1 | 4,1 |
|---|---|---|---|---|
| SP1 | 0.7315 | 0.1880 | 0.0632 | 0.0322 |
| SP2 | 0.0461 | 0.4980 | 0.3352 | 0.0285 |
| SP3 | 0.0367 | 0.2640 | 0.4442 | 0.0226 |
| SP4 | 0.1857 | 0.0500 | 0.1574 | 0.9166 |

FIG. 6g

| CONFIDENCE INDEX | $R(o_2=1, o_1=1)$ | $R(o_2=2, o_1=1)$ | $R(o_2=3, o_1=1)$ | $R(o_2=4, o_1=1)$ |
|---|---|---|---|---|
| | 64.78% | 40.14% | 37.39% | 85.30% |

FIG. 6h

METHOD AND APPARATUS FOR DETERMINING ACCURACY OF THE ESTIMATED LOCATION FOR A TARGET IN A WIRELESS SYSTEM

CROSS-REFERENCES TO RELATED APPLICATIONS

This is a continuation-in-part application for the application Ser. No. 11/737,756 filed on Apr. 20, 2007, now abandoned, which is incorporated herewith by reference.

FIELD OF THE INVENTION

The present invention generally relates to a method and an apparatus for determining the accuracy of the location estimated for a target device in a wireless system.

BACKGROUND OF THE INVENTION

The wireless location determination system is widely applied to many systems, including location-sensitive content delivery, direction finding, asset tracking, emergency notification, and so on. To estimate the location of a target device, a location determining system must measure a quantity, which is at least a function of distance. This quantity can be the strength of signals transmitted from the access points (APs). In a free space, the signal strength will logarithmically decay with distance.

The wireless location determining system usually uses two phases for processing. One is a training phase, and the other is a location determining phase. The training phase is an offline phase, in which the system establishes the sample points (SP) and a map, known as a radio map, capturing the AP signatures at certain points of the coverage region. In the location determining phase, i.e., on-line phase, the signal strength vector from APs is compared to the radio map to find an optimal match, such as the nearest candidate, as the estimated location of the target device. There are many methods to estimate location and determine the estimation error.

Figure 1:
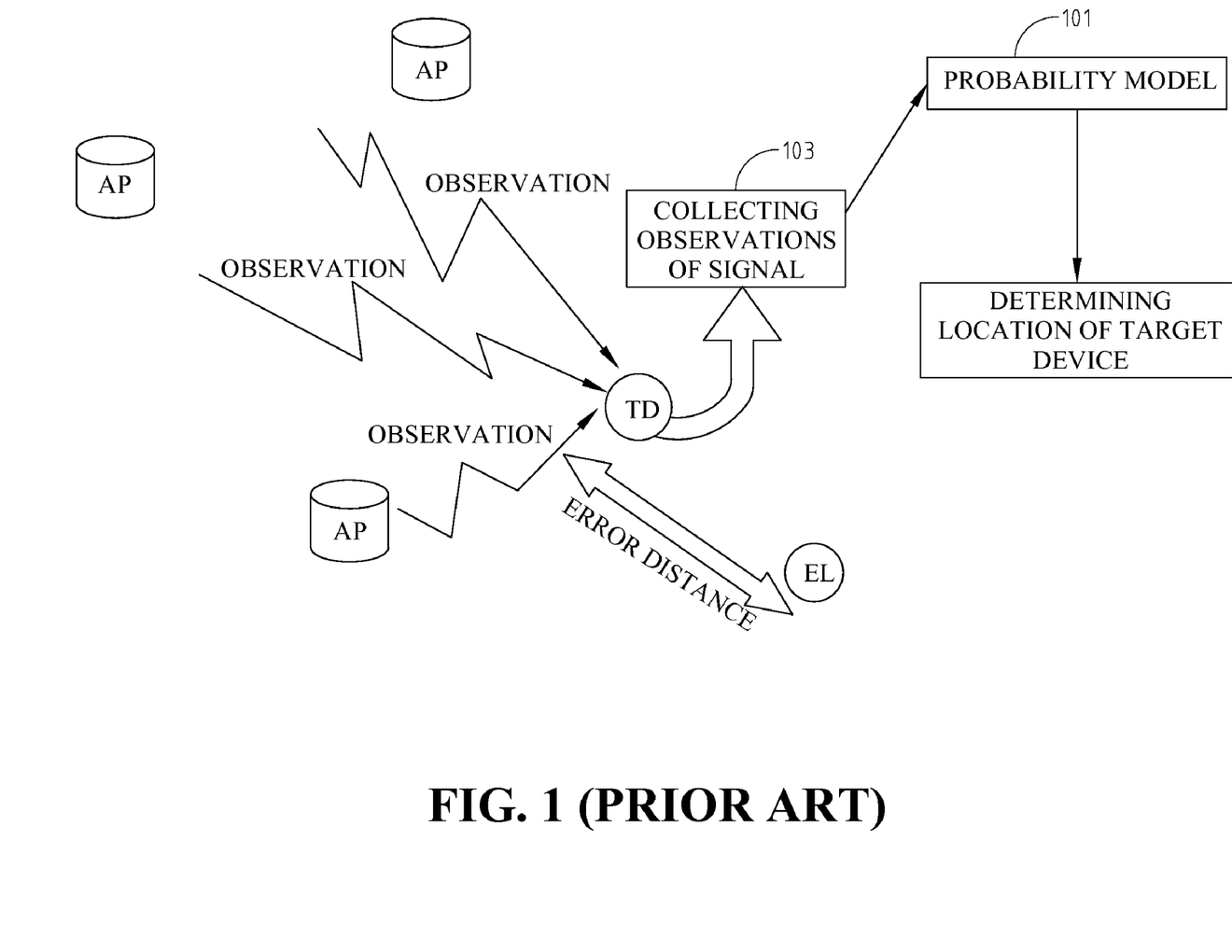
FIG. 1 shows a conventional method for determining error distance of a predicted location for a target device.

U.S. Patent Publication No. 2005/0131635 disclosed a method for determining the error distance of the predicted location of a target device. This method is based on a probabilistic model 101 and the collected observations of signal value 103 to determine the location of the target device, as shown in FIG. 1. The probabilistic model 101 shows the signal value probability distribution of a plurality of APs. The error estimate is determined by the expectation of the error distance between the actual location of the target device TD and the estimated location EL. The error distance estimation can be used to determine whether to add new SPs, or recalibrate the existing SPs.

The above method depends on the location decision rule. Therefore, there is a potential problem of improper decision rule or interference.

SUMMARY OF THE INVENTION

The examples of the present invention provide a method for determining the confidence index of the estimated location for a target device in a wireless system, and an apparatus for implementing the method. In location determining, the motion model and the location probability distribution of the target device can be used to calculate the uncertainty of the estimated location, and further to calculate the confidence index of the estimated location. The confidence index can be further applied to evaluate the fitness of the motion model and to define searching areas in the rescue operation.

After the observations of signals of the target device are received, the uncertainty of location probability distribution of the target device can be used to calculate the confidence index. In calculating the location probability distribution, the transition probability distribution of the target device moving from a location to another location is also taken into account. The meaning of the confidence index is a quantity to exclude the uncertainty of the location of the target device. The more the uncertainty is excluded, the higher the confidence index of the estimated location is.

The method for determining the confidence index of the present invention includes the following steps. First, a location probability density function is determined. The location probability density function is a conditional density function $p(q_t|\{o_k\}_{k=1}^t)$, where $\{o_k\}_{k=1}^t$ is the received radio signals from the receiver of the target device from time 1 to time t. Then, the uncertainty of the location probability density function is calculated, and the maximum uncertainty in the current situation is also calculated. Finally, the confidence index is calculated for the current location estimate.

For implementing the method, an apparatus may include a location probability model, a module for calculating the uncertainty of the location probability density function $p(q_t|\{o_k\}_{k=1}^t)$ and the maximum uncertainty in the current situation, and a confidence index module for calculating the confidence index.

DETAILED DESCRIPTION OF THE PREFERRED EMBODIMENTS

Figure 2A:
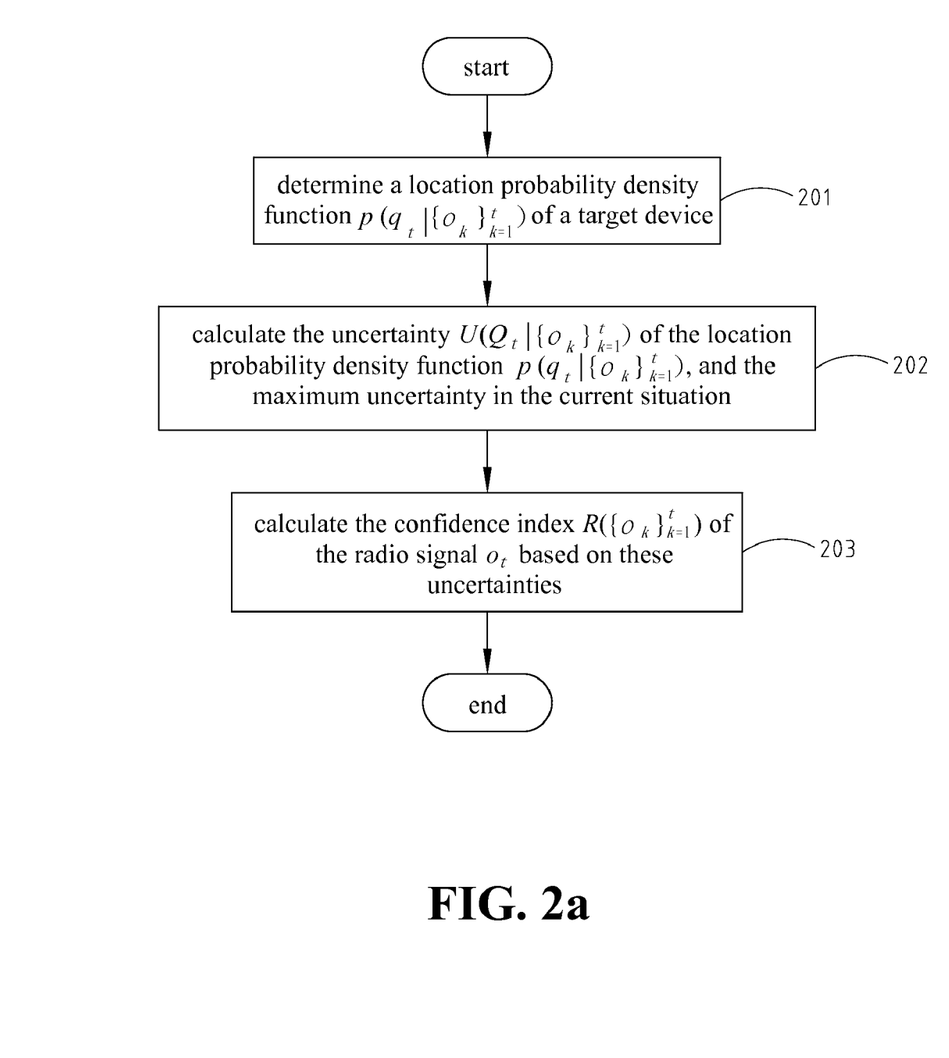
FIG. 2a shows a flowchart illustrating the operating flow for determining the confidence index of an estimated location in a wireless system of the present invention.
Figure 2B:
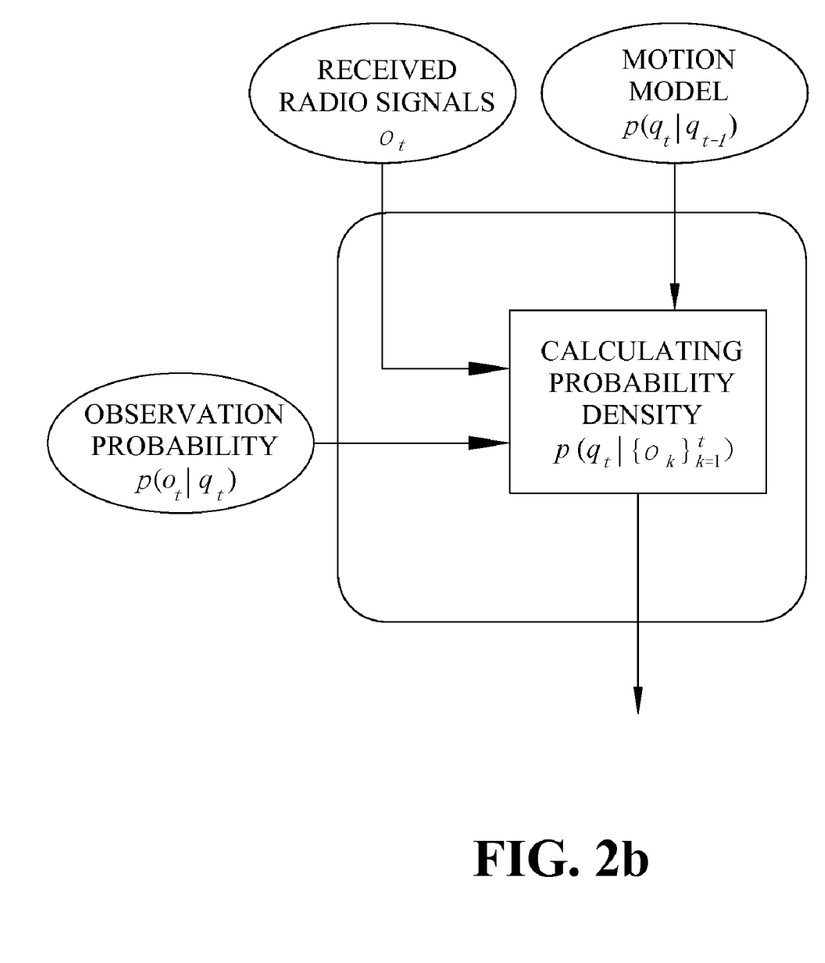
FIG. 2b shows the parameters needed in calculating the location probability density function.

As aforementioned, wireless location determining systems usually process in two phases. One is the training phase, and the other is the location determining phase. The present invention computes the confidence index when the received radio signals $\{o_k\}_{k=1}^t$ from the receiver of the target device from time 1 to time t are available in the location determining phase for estimating a current location $q_t$ at time t. FIG. 2a shows a flowchart illustrating the operating flow for determining the confidence index of the estimated location in a wireless system according to the present invention. FIG. 2b shows parameters needed to calculate location probability density function.

As shown in FIG. 2a, the first step is to determine a location probability density function of a target device, as shown in step 201. There are many possible examples of the location probability density functions. Without loss of generality, the following location probability density function uses posterior probability density function $p(q_t|\{o_k\}_{k=1}^t)$ for description.

The next step is to calculate the uncertainty $U(Q_t|\{o_k\}_{k=1}^t)$ of the location probability density function $p(q_t|\{o_k\}_{k=1}^t)$, and the maximum uncertainty in the current situation, as shown in step 202. Step 203 is to calculate the confidence index $R(\{o_k\}_{k=1}^t)$ based on these uncertainties. The following describes the detailed operations of steps 201-203.

Figure 3:
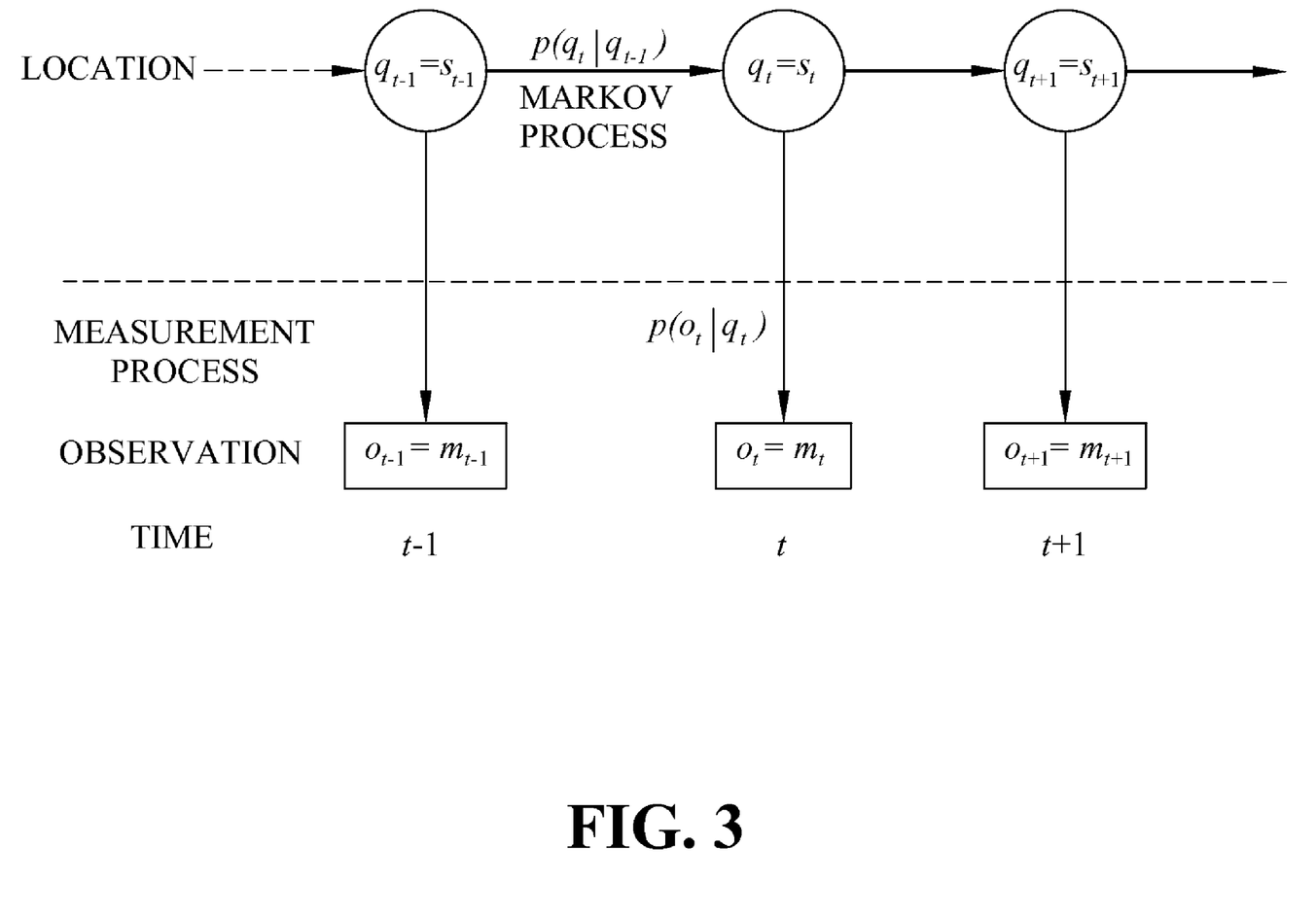
FIG. 3 shows how a Hidden Markov Model (HMM) is applied to a location determining system.

In step 201, the location probability density function is a conditional probability density function $p(q_t|\{o_k\}_{k=1}^t)$, where $\{o_k\}_{k=1}^t$ is the received radio signals obtained from the receiver of the target device from time 1 to time t. The location probability density function $p(q_t|\{o_k\}_{k=1}^t)$ of the target device can be calculated by applying Hidden Markov Model (HMM) to the location tracking system. FIG. 3 shows how a Hidden Markov Model (HMM) is applied to a location determining system. As shown in FIG. 3, the HMM includes the transition probability between two locations and the probability of observation at a specified location. The location probability can be calculated from the transition probability between two locations and the probability of observation at a specified location.

When time changes from t−1 to t+1, the target device moves along three locations $q_{t-1}$, $q_t$, and $q_{t+1}$. Notice that $q_{t-1}$ is the previous location at previous time t−1, $q_t$ is the current location of the target device at time t, and $q_{t+1}$ is the future location at time t+1. $P(q_t|q_{t-1})$ is the probability that the target device moves from $q_{t-1}$ to $q_t$ during time t−1 to t. This transition probability can, however, be derived from exterior information such as the paths plans in a static database like the GIS system or the target device's motion model obtained real time. The motion model may contain the direction, speed and acceleration of the target device from multiple sensors or a predicted location from a Kalman filter tracking the target device. In the measurement process, the observations of the radio signal are reported. The observations are the quantity only related to the location at the corresponding time. Without loss of generality, the reported observation of radio signals by the target device forms a probability distribution, and furthermore, a conditional probability. In other words, condition probability $P(o_t=m_t|q_t=s_t)$ is the probability that the observation is $m_t$ when the target device is at location $s_t$. To obtain distributions of the observed radio signals at every location, a device is needed to collect the radio signals during the training phase. The collected data are transformed to the aforementioned probability density functions and then stored in the positioning system for the use during on-line phase.

Figure 4:
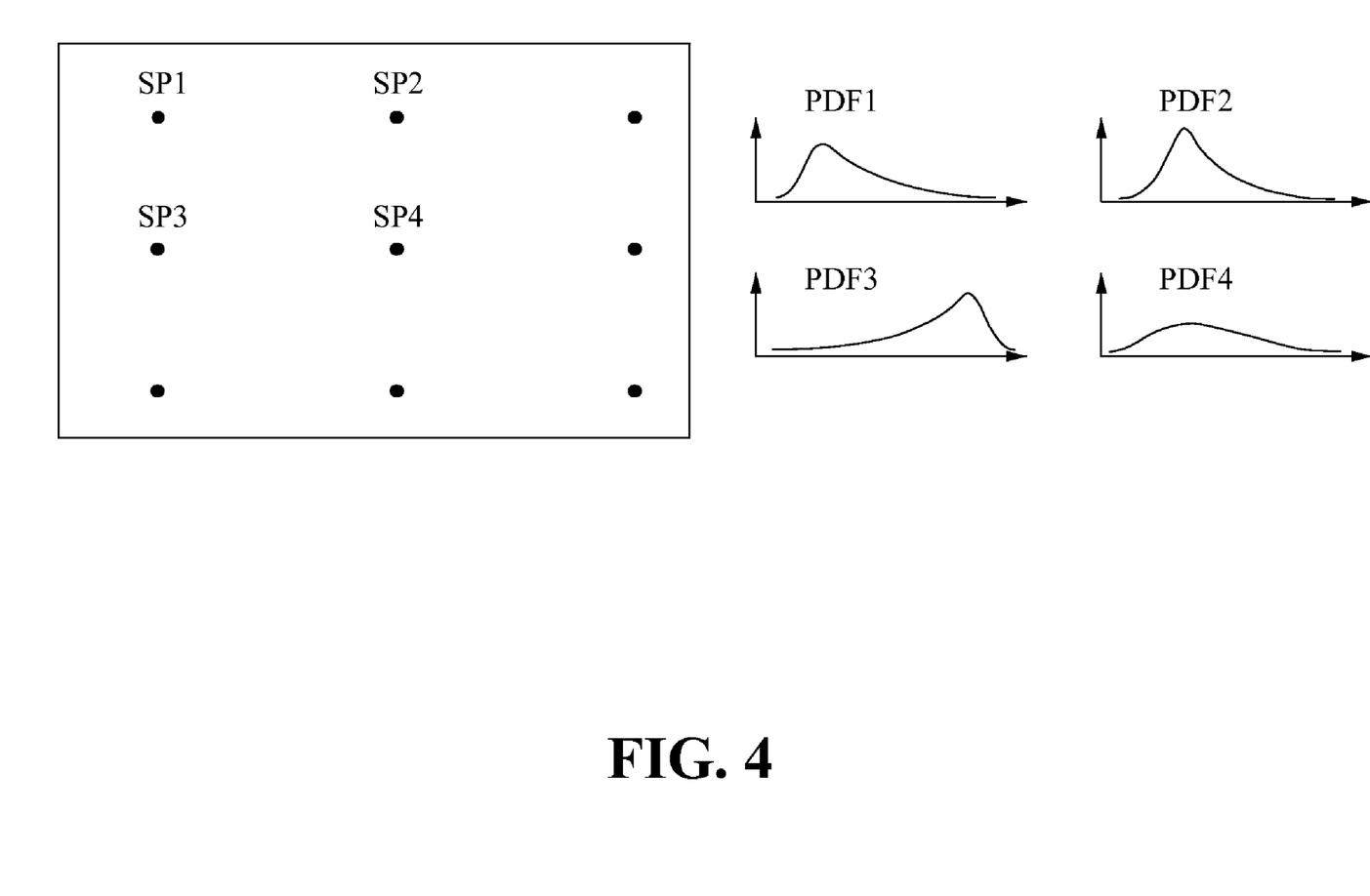
FIG. 4 shows the four probability distribution functions corresponding to the radio signals received at four different locations.

FIG. 4 shows the four probability distributions PDF1-PDF4 corresponding to the radio signals received at four different locations SP1-SP4. In general, the location-conditioned probabilities of observations can be viewed as independent of each other. That is, $P(o_t=m_t, o_{t-1}=m_{t-1}|q_t=s_t, q_{t-1}=s_{t-1})=P(o_t=m_t|q_t=s_t) \; P(o_{t-1}=m_{t-1}|q_{t-1}=s_{t-1})$. Furthermore, the current location of the target device can be viewed as only dependent on the last location. That is, the transition model of two locations follows the Markov $P(q_t=s_t|q_{t-1}=s_{t-1}, q_{t-1}=s_{t-2}, \ldots q_0=s_0)=P(q_t=s_t|q_{t-1}=s_{t-1})$.

Because it is impossible to directly obtain the locations $q_{t-1}$, $q_t$, and $q_{t+1}$ of the target device, the present invention uses a series of observations $o_{t-1}$, $o_t$, and $o_{t+1}$ to estimate the location of the target device.

Therefore, the location probability density function $p(q_t|\{o_k\}_{k=1}^t)$ can be obtained from the following equation:

$$p(q_t|\{o_k\}_{k=1}^t) = \frac{p(q_t, \{o_k\}_{k=1}^t)}{p(\{o_k\}_{k=1}^t)}.$$

Because the current observation only depends on the current location of the target device, the numerator $p(q_t, \{o_k\}_{k=1}^t)$ of location probability density function $p(q_t|\{o_k\}_{k=1}^t)$ can be expressed as the following equation:

$p(q_t, \{o_k\}_{k=1}^t) = p(o_t|q_t)p(q_t|\{o_k\}_{k=1}^{t-1})$, where $p(q_t|\{o_k\}_{k=1}^{t-1})$ is the location prediction of next time under the condition of having observations up to time t−1. The aforementioned probability density function of predicted location can further be represented in the following:

$$p(q_t|\{o_k\}_{k=1}^{t-1}) = \sum_{q_{t-1} \in Q_{t-1}} p(q_t|q_{t-1})p(q_{t-1}|\{o_k\}_{k=1}^{t-1})$$

where $p(q_t|q_{t-1})$ is the transition probability that the target device moves from location $q_{t-1}$ at previous time t−1 to possible location $q_t$ at current time t. The transition probability can be derived from the motion model and is assumed to follow HMM.

According to the Bayes' theorem, the denominator $p(\{o_k\}_{k=1}^t)$ of location probability density function $p(q_t|\{o_k\}_{k=1}^t)$ can be obtained from the following equation:

$$\sum_{q_t \in Q_t} p(o_t|q_t)p(q_t|\{o_k\}_{k=1}^{t-1}) = \sum_{q_t \in Q_t} \sum_{q_{t-1} \in Q_{t-1}} p(o_t|q_t)p(q_t|q_{t-1})p(q_{t-1}|\{o_k\}_{k=1}^{t-1}).$$

Figure 5:
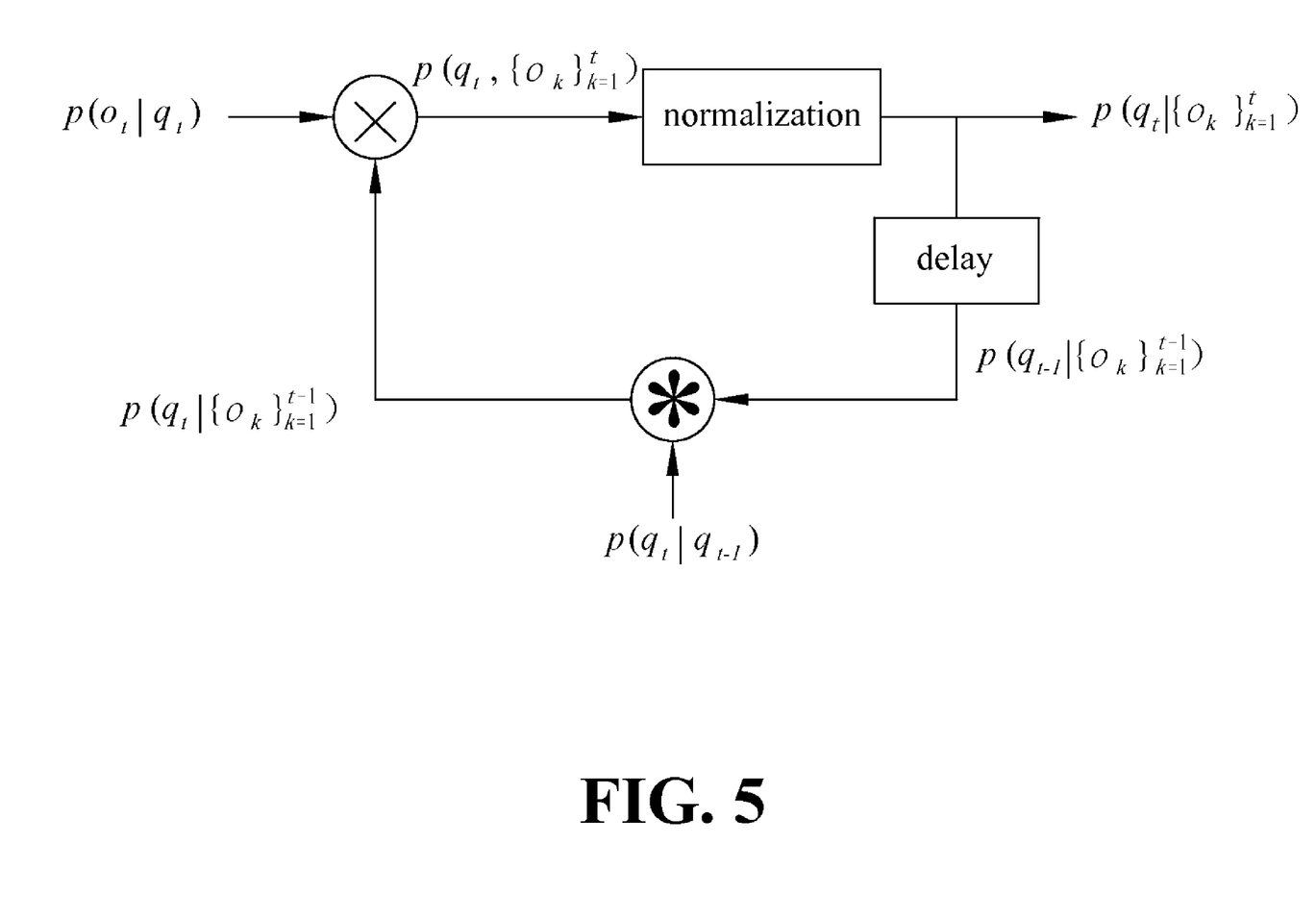
FIG. 5 shows the recursive structure to calculate location probability density function.

The aforementioned calculation of location probability density function can be implemented by the recursive structure as in FIG. 5. The star symbol (*) stands for the convolution-like operation:

$$p(q_t|\{o_k\}_{k=1}^{t-1}) = \sum_{q_{t-1} \in Q_{t-1}} p(q_t|q_{t-1})p(q_{t-1}|\{o_k\}_{k=1}^{t-1})$$

and the cross symbol (×) stands for the arithmetical multiplication: $p(q_t, \{o_k\}_{k=1}^t) = p(o_t|q_t)p(q_t|\{o_k\}_{k=1}^{t-1})$ and the normalization block implements accumulation and inverse multiplication.

The motion model and the location probability distribution of the target device can be used to calculate the uncertainty of the estimated location.

In step 202, the uncertainty $U(Q_t|\{o_k\}_{k=1}^t)$ of location probability density function $p(q_t|\{o_k\}_{k=1}^t)$ can be the self-contained information function of location probability density function $p(q_t|\{o_k\}_{k=1}^t)$, such as the average. Uncertainty $U(Q_t|\{o_k\}_{k=1}^t)$ can be calculated by the following equation:

$$U(Q_t|\{o_k\}_{k=1}^t) = H(Q_t|\{o_k\}_{k=1}^t) = -\sum_{q_t \in Q_t} p(q_t|\{o_k\}_{k=1}^t)\log_2 p(q_t|\{o_k\}_{k=1}^t),$$

where $Q_t$ is all possible locations of the target device at time t, $\{o_k\}_{k=1}^t$ are the specific observations received by the target device from time 1 to t, $p(q_t|\{o_k\}_{k=1}^t)$ is the probability that the target device's location is $q_t$ at time t, given that $\{o_k\}_{k=1}^t$ are received, and $H(Q_t|\{o_k\}_{k=1}^t)$ is the entropy of the location probability distribution $p(q_t|\{o_k\}_{k=1}^t)$.

It is worth noting that $H(Q_t|\{o_k\}_{k=1}^t)$ can be expressed as the following equation:

$$H(Q_t|\{o_k\}_{k=1}^t) = \sum_{q_t \in Q_t} \frac{p(q_t,\{o_k\}_{k=1}^t)}{p(\{o_k\}_{k=1}^t)} \log_2 \frac{p(\{o_k\}_{k=1}^t)}{p(q_t,\{o_k\}_{k=1}^t)},$$

where $p(\{o_k\}_{k=1}^t) = \sum_{q_t \in Q_t} \sum_{q_{t-1} \in Q_{t-1}} p(o_t|q_t)p(q_t|q_{t-1})p(q_{t-1}|\{o_k\}_{k=1}^{t-1}),$ and $p(q_t,\{o_k\}_{k=1}^t) = \sum_{q_{t-1} \in Q_{t-1}} p(o_t|q_t)p(q_t|q_{t-1})p(q_{t-1}|\{o_k\}_{k=1}^{t-1}).$ The maximum entropy of the all possible probability distributions occurs when the probabilities of possible locations are the same under the same condition, and the maximum entropy is $\log_2 (|Q_t|)$, where $|Q_t|$ is the total number of all possible locations at time t and can be determined from a pre-defined size of the searching area.

According to the meaning of the information entropy, the larger the entropy is, the more uncertainty the estimated location has. In other words, the prediction is less reliable. Therefore, the confidence index can be viewed as the quantity to exclude the uncertainty of the estimated location of the target device in the prediction. The more uncertainty the quantity can exclude, the higher the confidence index of the estimated location is.

The present invention defines the confidence index of the estimated location of the target device as the functions of two variables. One is the current received radio signal, and the other is the maximum entropy of all possible probability distributions under the same condition. Therefore, in step 203, the confidence index of the present invention depends on the quantity of location uncertainty of the target device that can be excluded from the location prediction of the target device. An example of the definition of the confidence index $R(\{o_k\}_{k=1}^t)$ is as follows:

$$R(\{o_k\}_{k=1}^t) = \sqrt{1 - \frac{H(Q_t|\{o_k\}_{k=1}^t)}{\log_2(|Q_t|)}} \times 100\%,$$

where $|Q_t|$ is the total number of all possible locations at time t, and $\log_2(|Q_t|)$ is the maximum entropy of all possible probability distributions under the same condition.

It is worth noting that the probability distribution that has the maximum entropy among all possible probability distributions indicates that the estimated location may be randomly selected, and the confidence index $R(\{o_k\}_{k=1}^t)$ accordingly shall be 0%. On the contrary, if the received observation of radio signal is known, and the target device is in a certain grid/sample point with probability 1, the confidence index $R(\{o_k\}_{k=1}^t)$ shall be 100%.

For implementing the method with the operating flow as shown in FIG. 2a, an apparatus may include a location probability model consisting of static geographic database, a motion model or a location prediction module to give a motion model of target device, a radio signal receiver and database that contains probability density functions of observations, a module for calculating the uncertainty $U(Q_t|\{o_k\}_{k=1}^t)$ of the location probability density function $p(q_t|\{o_k\}_{k=1}^t)$ and the maximum uncertainty in the current situation, and a confidence index module for calculating the confidence index $R(\{o_k\}_{k=1}^t)$. The term of location probability model refers to a model that indicates a location probability density function for a target device in the wireless system, when a received radio signal from the target device is known.

Figure 6A:
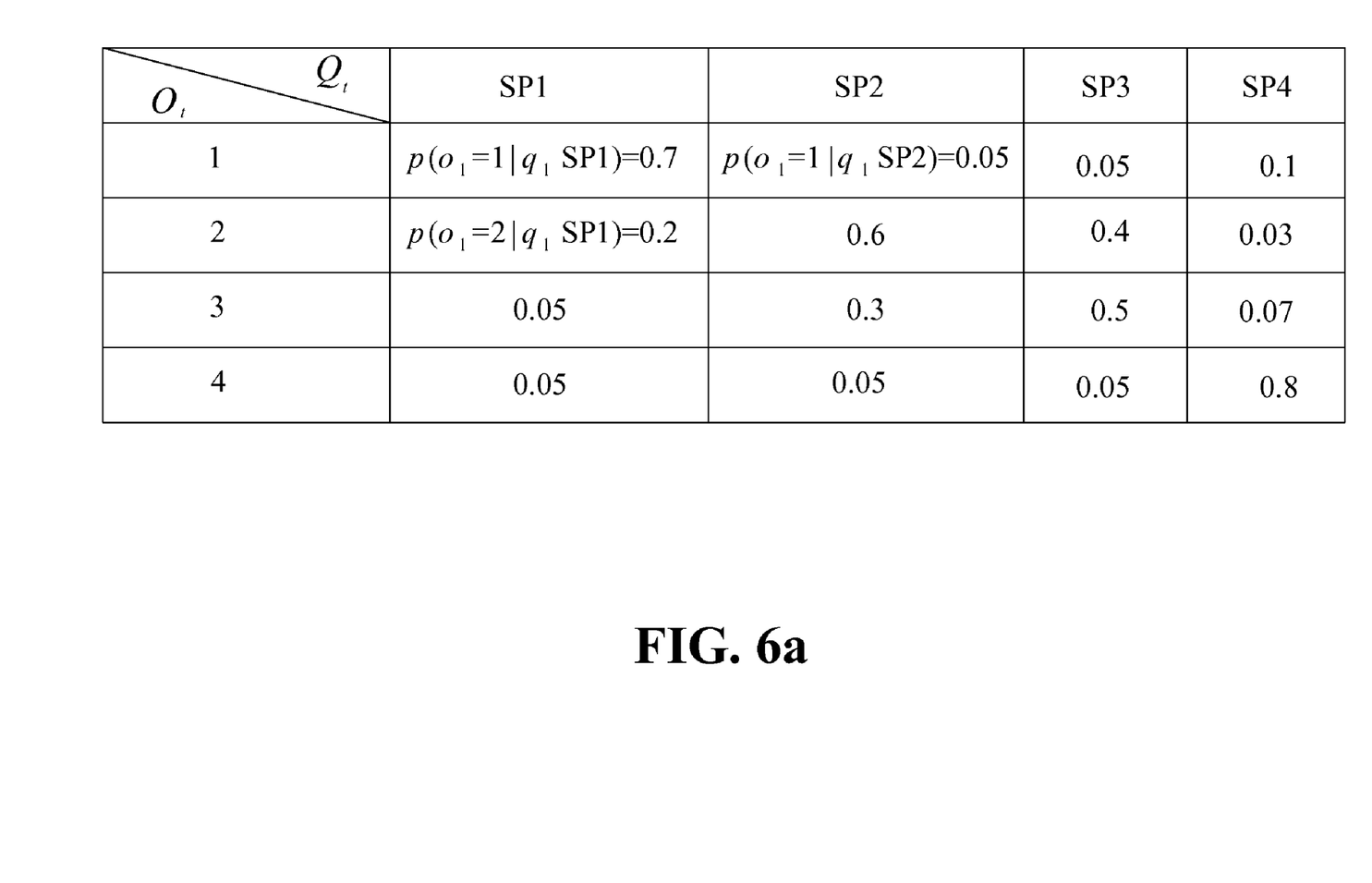
FIG. 6a shows a pre-trained radio map.
Figure 6B:
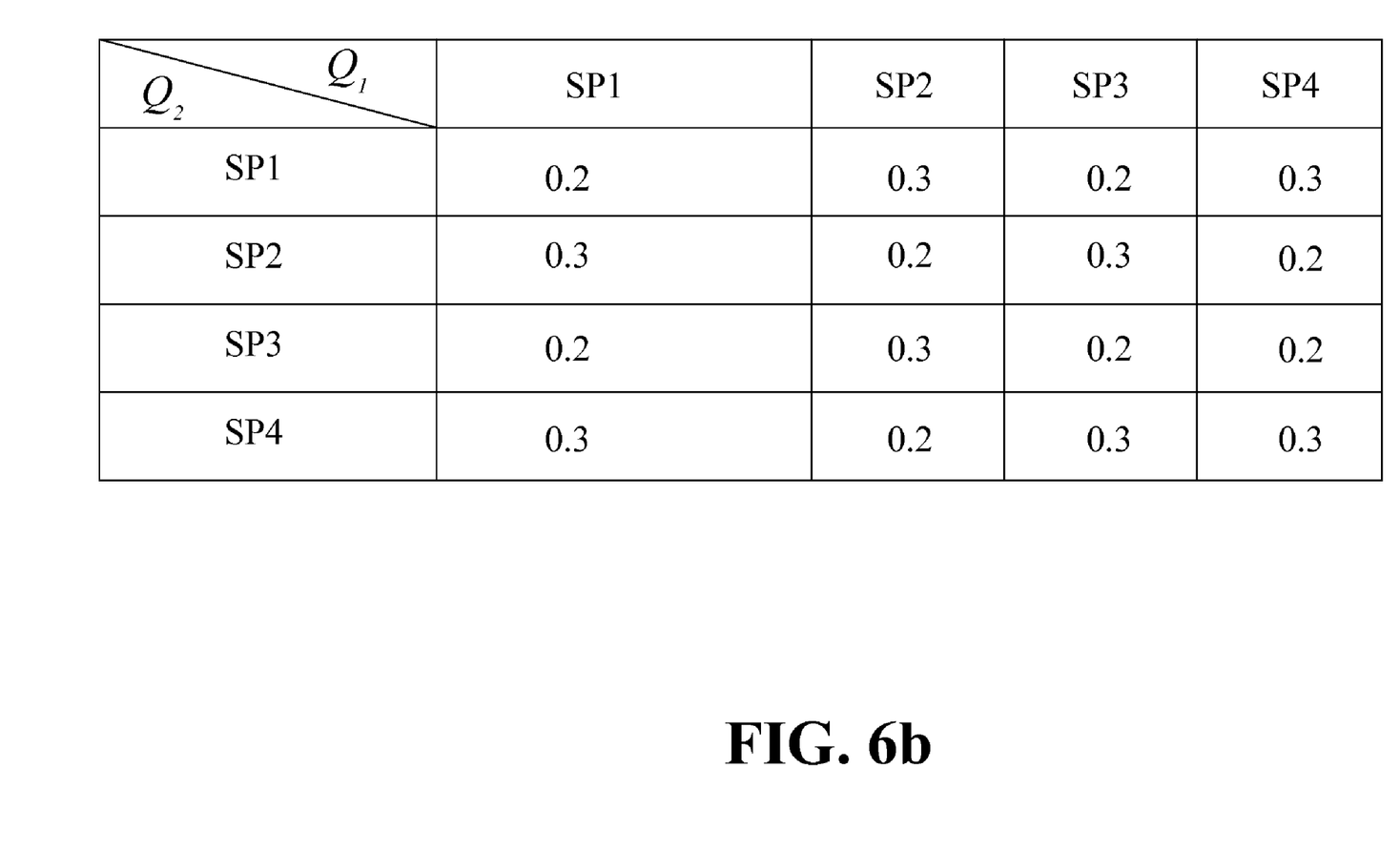
FIG. 6b illustrating the transition probability of a target device moving to each location.
Figure 6C:
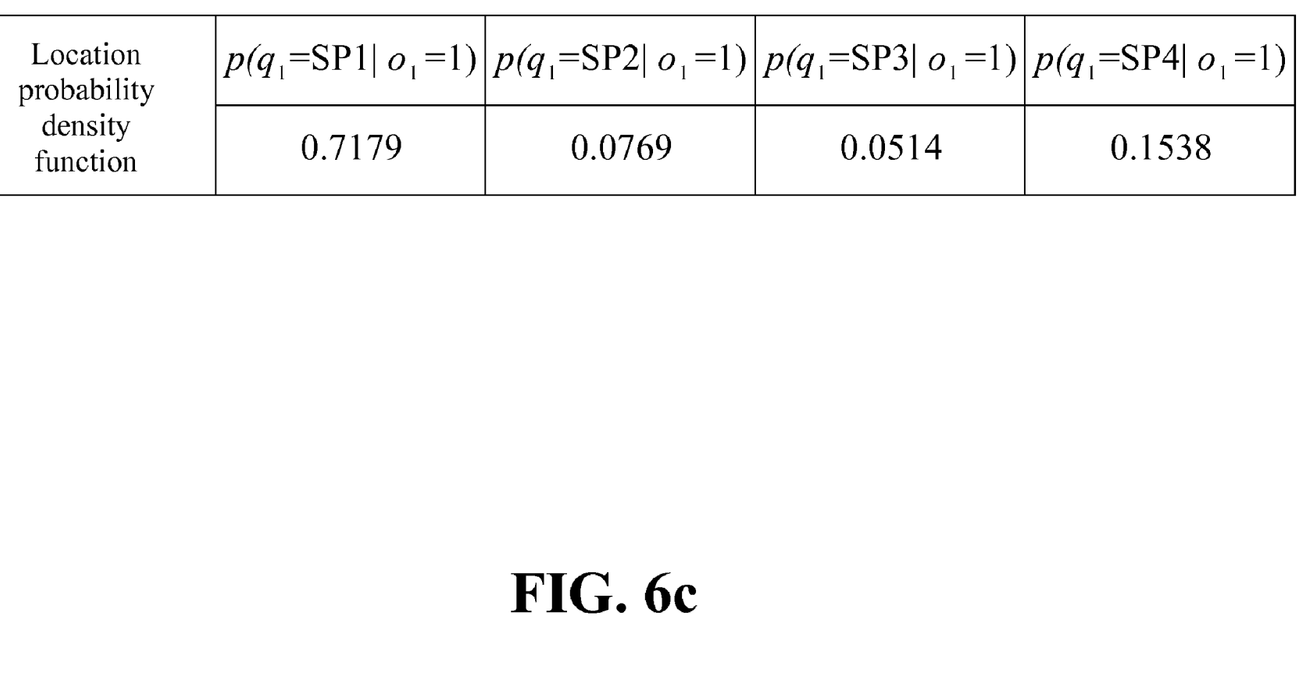
FIG. 6c shows a pre-calculated location probability density function.

The following uses the four locations, SP1-SP4, as an example to describe how the uncertainty measurement is applied to the confidence index of estimated location. The known environment and the initial conditions of the wireless location determining system include the following: (a) a pre-trained radio map (FIG. 6a), (b) the transition probability of the target device (FIG. 6b) and (c) pre-calculated location probability density function (FIG. 6c).

Figure 6D:
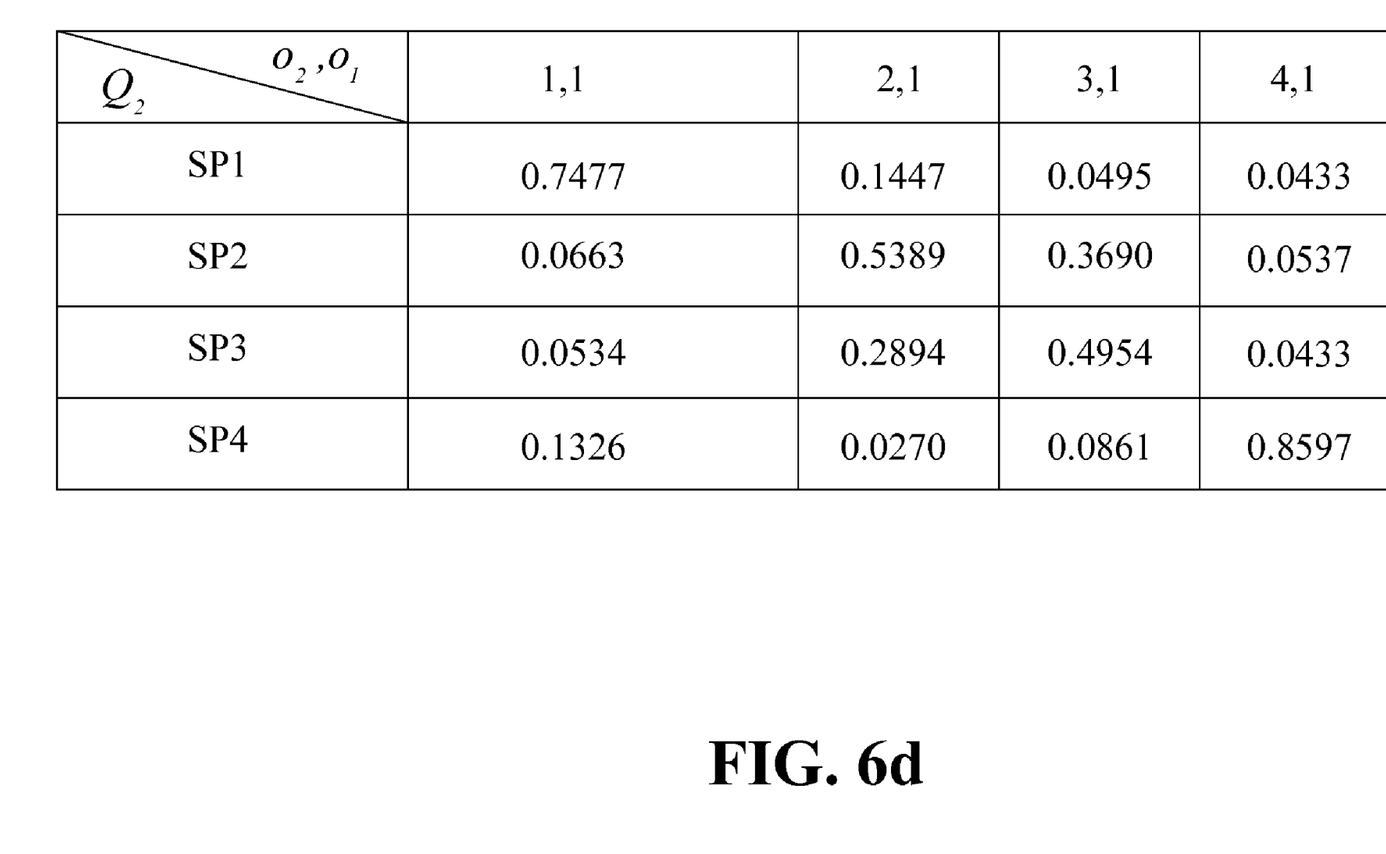
FIG. 6d shows location probability density functions for different observations.
Figure 6E:
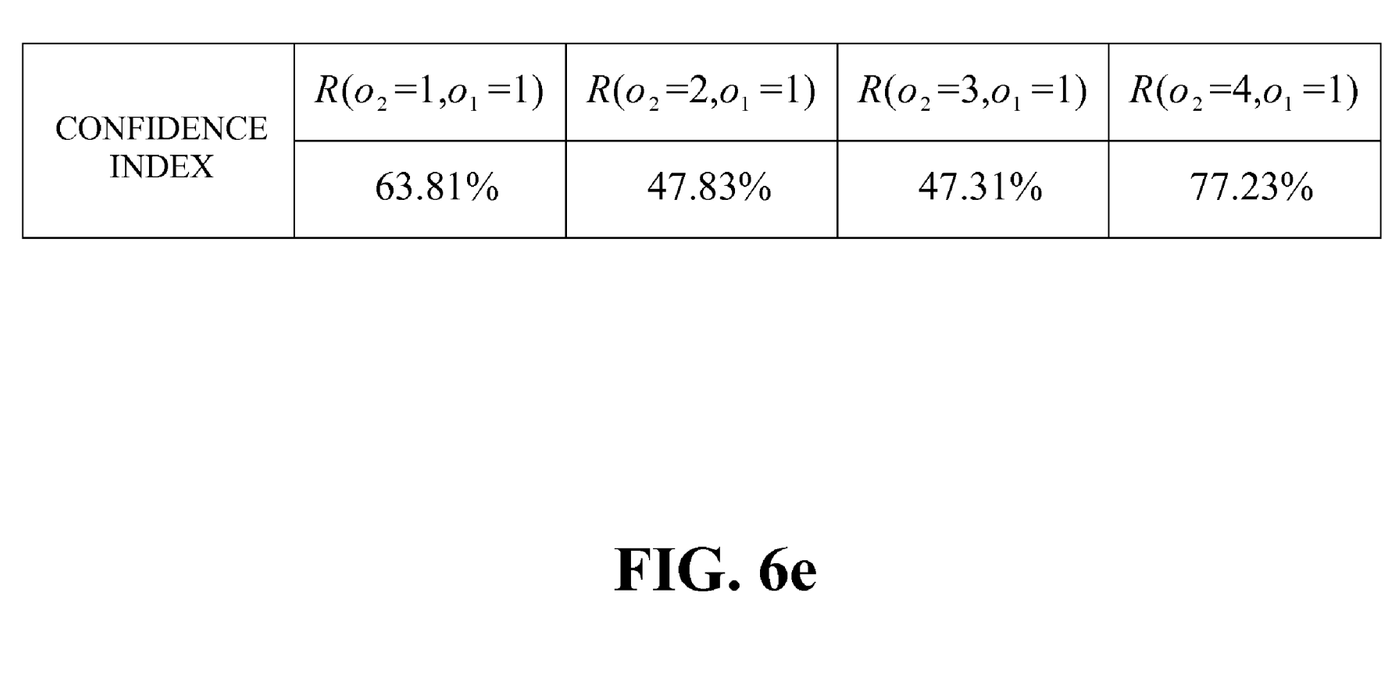
FIG. 6e shows a working example of the confidence index based on FIG. 6d.

According to step 201 of FIG. 2a and the aforementioned description, the determined location probability density function of the target device is $p(q_2|\{o_k\}_{k=1}^2)$, as shown in FIG. 6d. Finally, based on the example of the confidence index $$R(\{o_k\}_{k=1}^2) = \sqrt{1 - \frac{H(Q_2|\{o_k\}_{k=1}^2)}{\log_2(|Q_2|)}} \times 100\%,$$

the confidence index $R(\{o_k\}_{k=1}^2)$ can be obtained, as shown in FIG. 6e.

The results of FIG. 6e show that the lowest confidence index is 47.31% when received observation $o_t$ is 3. In other words, the most unreliable observation is signal 3, and the reason is that the inherited probability distribution of the observation at SP3 has a greater variance.

Figure 6F:
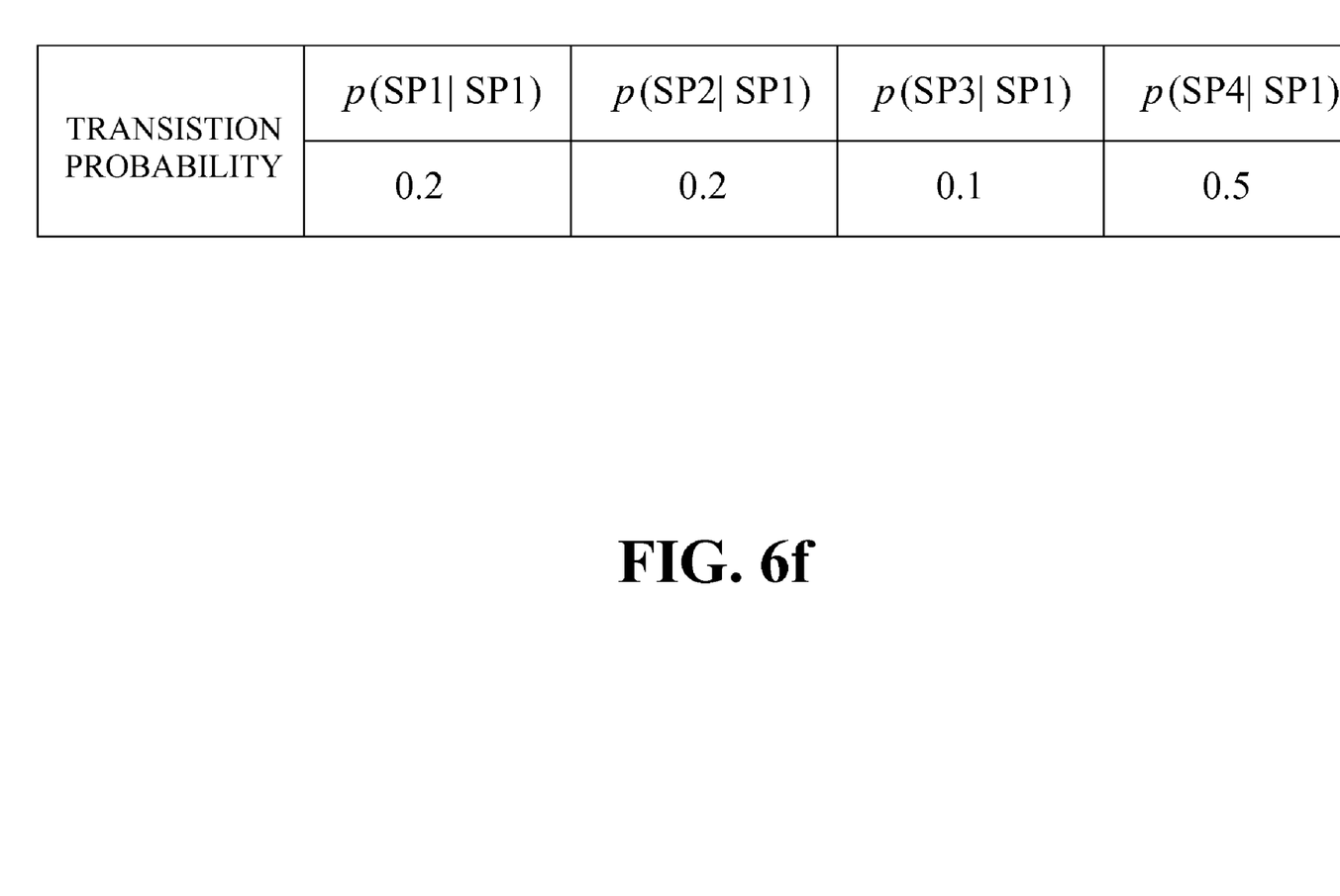
FIG. 6f shows another set of transition probability from SP1 to each location and the rest remains the same as in FIG. 6b.
Figure 6G:
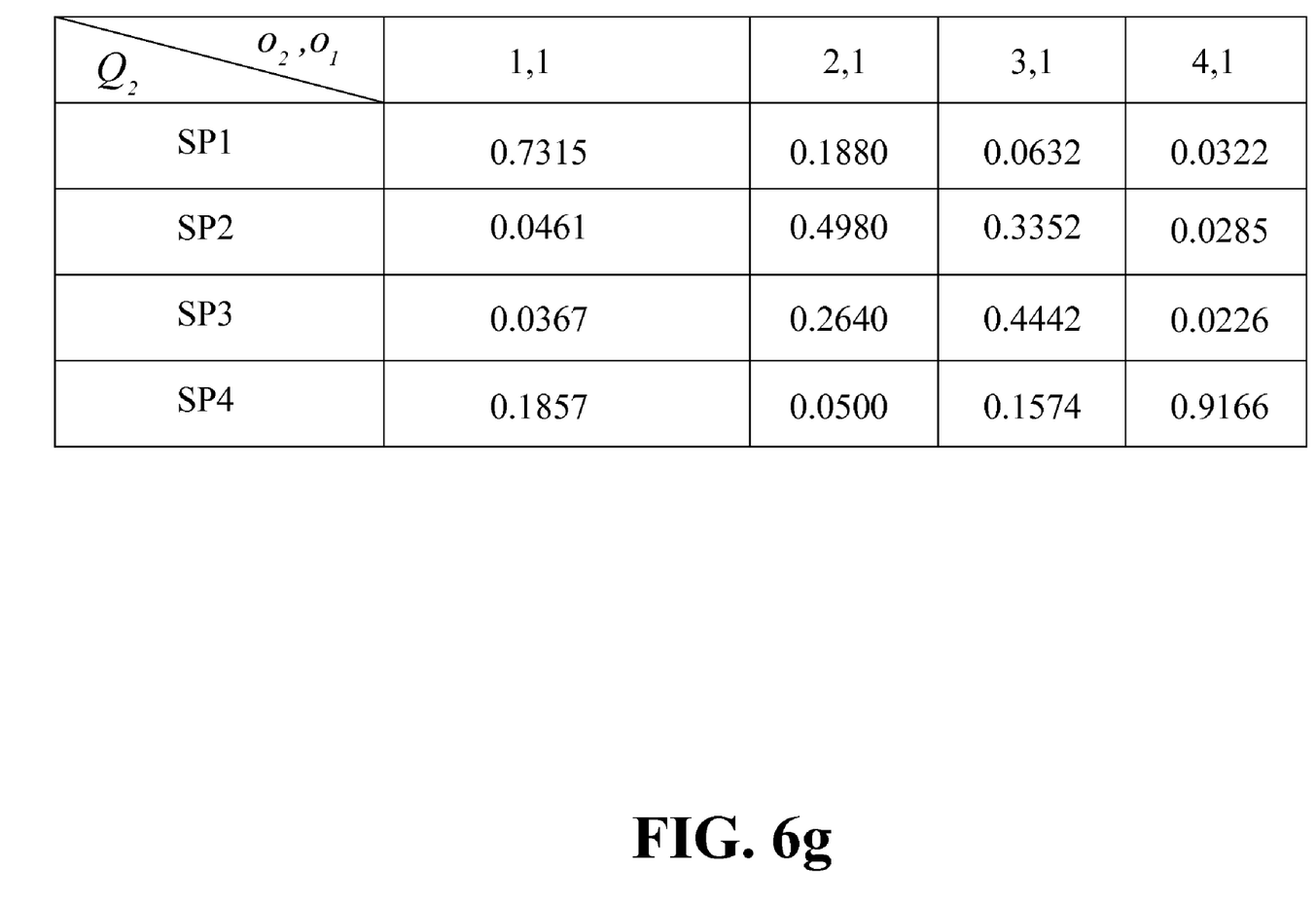
FIG. 6g shows location probability density functions for different observations based on the transition probability function in FIG. 6f.
Figure 6H:
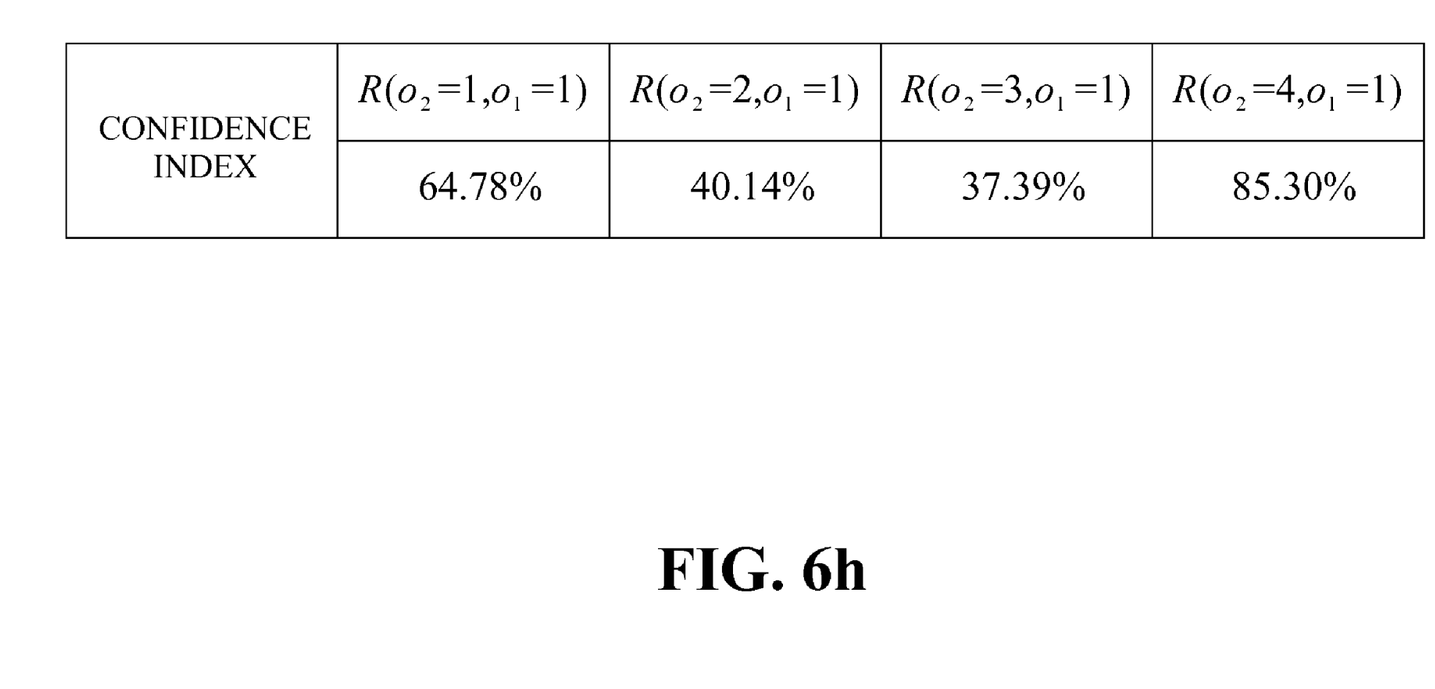
FIG. 6h shows a working example of the confidence index based on FIG. 6g.

In the following, the use of confidence index to evaluate the motion model is illustrated. FIG. 6f gives another set of transition probability from SP1 to each location and the rest remain the same as in FIG. 6b. The location probability density and the confidence index based on FIG. 6f are shown in FIG. 6g and 6h, respectively. In this case, the transition probability from SP1 to SP4 is higher than the rest due to the prediction of the motion model tracking the target device. If the current radio signal observation is the one with highest observation probability in SP4 according to the radio map, the location estimation will therefore have high confidence index. Moreover, if this situation continues, it indicates that the motion model in this case is suitable. On the contrary, if location estimations keep having low confidence, the tracking policies used in the motion model should be changed immediately. Thus the confidence index can be an effective index to evaluate the motion model.

The confidence index can also be applied to operations of rescue and surveillance. In the on-line phase, we cannot know the error distance of a predicted location since the ground truth of the target device cannot be obtained during this time. However, to evaluate how accurate a predicted location can be by the positioning system is necessary if the provided location-based service concerns search and rescue for emergency and surveillance of clients. For instance, if an emergent call is made by a client, rescue operation will be different for different confidence levels of the estimated locations. If the estimated location has a low confidence index, say 30%, the search area for the client should start from its previous locations with high confidence index values and should cover all possible locations at the current time. On the other hand, if a target device is under surveillance, the positioning system should warn the operator when its confidence index of an estimated location down cross a pre-defined threshold or when it has low confidence index values for a long time.

In summary, during the location determining, when a target device receives the radio signal, the present invention can determine the uncertainty of the estimated location based on the motion model and the location probability distribution of the target device, and further obtains the confidence index of the estimated location. The confidence index depends on the location uncertainty that can be excluded from the estimated location. The flatter the posterior location probability distribution is, the lower the confidence index is. As can be seen from the above description and examples, the present invention provides a method of evaluating and determining the accuracy of an estimated location of a target device in a wireless system by computing the confidence index of the estimated location. The higher the confidence index is, the more accurate the estimated location is.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for determining accuracy of an estimated location of a target device in a wireless system by using an apparatus having computing and storage devices, said method comprising the steps of:
    determining a location probability density function of said target device using said computing device based on a location probability model stored in said storage device, said location probability model indicating the location probability density function of said target device when a received radio signal from said target device is known;
    calculating an uncertainty at a current estimated location and a possible maximum uncertainty using said computing device based on radio signals received by said target device according to said location probability density function; and
    calculating a confidence index of said current estimated location using said computing device based on said uncertainty and said maximum uncertainty by computing an uncertainty quantity defined as a ratio of said uncertainty to said maximum uncertainty and computing said confidence index as a function of said uncertainty quantity;
    wherein said confidence index of said current estimated location determines the accuracy of said current estimated location with higher confidence index representing higher accuracy.

2. The method as claimed in claim 1, wherein said confidence index depends on the quantity of said uncertainty of said current estimated location that is excluded from location prediction for said target device.

3. The method as claimed in claim 1, wherein said location probability density function is a conditional probability density function $p(q_t|\{o_k\}_{k=1}^t)$, where $q_t$ is a location at time t, $o_k$ is a radio signal received by said target device at time k which has a time range from 1 to t, and $\{o_k\}_{k=1}^t$ are said radio signals received by said target device.

4. The method as claimed in claim 3, wherein said conditional probability density function $p(q_t|\{o_k\}_{k=1}^t)$ is determined by computing $$p(q_t|\{o_k\}_{k=1}^t) = \sum_{q_{t-1} \in Q_{t-1}} p(q_t|q_{t-1}) p(q_{t-1}|\{o_k\}_{k=1}^{t-1}),$$

wherein $p(q_t|q_{t-1})$ is a transition probability that said target device moves from location $q_{t-1}$ at time t−1 to location $q_t$ at current time, and $Q_{t-1}$ represents all possible locations of said target device at time t−1.

5. The method as claimed in claim 3, wherein said uncertainty is calculated from a self-contained information function of said location probability density function.

6. The method as claimed in claim 5, wherein said $p(q_t|\{o_k\}_{k=1}^t)$ is determined from a transition probability between two locations and the probability of receiving said radio signals $\{o_k\}_{k=1}^t$ by applying a Hidden Markov model.

7. The method as claimed in claim 6, wherein said self-contained information function is defined as $U(Q_t|\{o_k\}_{k=1}^t)$ obtained through the following expression:

$$U(Q_t|\{o_k\}_{k=1}^t) = H(Q_t|\{o_k\}_{k=1}^t) = -\sum_{q_t \in Q_t} p(q_t|\{o_k\}_{k=1}^t) \log_2 p(q_t|\{o_k\}_{k=1}^t),$$

wherein $Q_t$ represents all possible locations of said target device at time t, $H(Q_t|\{o_k\}_{k=1}^t)$ is an entropy of said location probability density function $p(q_t|\{o_k\}_{k=1}^t)$.

8. The method as claimed in claim 7, wherein said maximum uncertainty occurs when the probabilities of possible locations according to said location probability density function are identical, and said maximum uncertainty has a maximum entropy.

9. The method as claimed in claim 8, wherein said maximum entropy is $\log_2(|Q_t|)$.

10. The method as claimed in claim 9, wherein said confidence index is a function of $H(Q_t|\{o_k\}_{k=1}^t)$ and $\log_2(|Q_t|)$.

11. An apparatus having computing and storage devices configured for determining accuracy of an estimated location of a target device in a wireless system, said apparatus comprising:
    a probability density function generator configured with said computing device for generating a location probability density function for said target device based on a location probability model stored in said storage device, said location probability model indicating the location probability density function of said target device when a received radio signal from said target device is known;
    an uncertainty computation module configured with said computing device for calculating an uncertainty at a current estimated location and a possible maximum uncertainty based on radio signals received by said target device according to said location probability density function; and
    a confidence index computing module configured with said computing device for calculating a confidence index of said current estimated location based on said uncertainty and said maximum uncertainty by computing an uncertainty quantity defined as a ratio of said uncertainty to said maximum uncertainty and computing said confidence index as a function of said uncertainty quantity;

wherein said confidence index of said current estimated location determines the accuracy of said current estimated location with higher confidence index representing higher accuracy.

12. The apparatus as claimed in claim 11, wherein said confidence index depends on the quantity of said uncertainty of said current estimated location that is excluded from location prediction for said target device.

13. The apparatus as claimed in claim 11, wherein said location probability density function is a conditional probability density function $p(q_t|\{o_k\}_{k=1}^{t})$, where $q_t$ is a location at time t, $o_k$ is a radio signal received by said target device at time k which has a time range from 1 to t, and $\{o_k\}_{k=1}^{t}$ are said radio signals received by said target device.

14. The apparatus as claimed in claim 13, wherein said conditional probability density function $p(q_t|\{o_k\}_{k=1}^{t})$ is determined by computing $$p(q_t|\{o_k\}_{k=1}^{t-1}) = \sum_{q_{t-1} \in Q_{t-1}} p(q_t|q_{t-1}) p(q_{t-1}|\{o_k\}_{k=1}^{t-1}),$$

wherein $p(q_t|q_{t-1})$ is a transition probability that said target device moves from location $q_{t-1}$ at time t−1 to location $q_t$ at current time, and $Q_{t-1}$ represents all possible locations of said target device at time t−1.

15. The apparatus as claimed in claim 13, wherein said uncertainty is calculated from a self-contained information function of said location probability density function.

16. The apparatus as claimed in claim 15, wherein said $p(q_t|\{o_k\}_{k=1}^{t})$ is determined from a transition probability between two locations and the probability of receiving said radio signals $\{o_k\}_{k=1}^{t}$ by applying a Hidden Markov model.

17. The apparatus as claimed in claim 16, wherein said self-contained information function is defined as $U(Q_t|\{o_k\}_{k=1}^{t})$ obtained through the following expression:

$$U(Q_t|\{o_k\}_{k=1}^{t}) = H(Q_t|\{o_k\}_{k=1}^{t}) = -\sum_{q_t \in Q_t} p(q_t|\{o_k\}_{k=1}^{t}) \log_2 p(q_t|\{o_k\}_{k=1}^{t}),$$

wherein $Q_t$ represents all possible locations of said target device at time t, $H(Q_t|\{o_k\}_{k=1}^{t})$ is an entropy of said location probability density function $p(q_t|\{o_k\}_{k=1}^{t})$.

18. The apparatus as claimed in claim 17, wherein said maximum uncertainty occurs when the probabilities of possible locations according to said location probability density function are identical, and said maximum uncertainty has a maximum entropy.

19. The apparatus as claimed in claim 18, wherein said maximum entropy is $\log_2(|Q_t|)$.

20. The apparatus as claimed in claim 19, wherein said confidence index is a function of $H(Q_t|\{o_k\}_{k=1}^{t})$ and $\log_2(|Q_t|)$.

* * * * *